United States Patent
Sun (10) Patent No.: US 7,161,886 B2
(45) Date of Patent: Jan. 9, 2007

(54) OPTICAL DISC IDENTIFICATION METHOD

(75) Inventor: Shang-Pin Sun, Tai-Nan (TW)

(73) Assignee: Mediatek Inc., Hsin-Chu Hsien (TW)

( * ) Notice: Subject to any disclaimer, the term of this patent is extended or adjusted under 35 U.S.C. 154(b) by 512 days.

(21) Appl. No.: 10/605,120

(22) Filed: Sep. 10, 2003

(65) Prior Publication Data

US 2005/0025017 A1 Feb. 3, 2005

(30) Foreign Application Priority Data

Jul. 30, 2003 (TW) .............................. 92120903 A (51) Int. Cl.
*G11B 7/00* (2006.01)
(52) U.S. Cl. .................................. 369/53.23
(58) Field of Classification Search ............. 369/53.22, 369/53.23
See application file for complete search history.

(56) References Cited

U.S. PATENT DOCUMENTS

| | | | | |
|---|---|---|---|---|
| 5,671,203 A * | 9/1997 | Ra | ........................... | 369/53.23 |
| 6,243,341 B1 * | 6/2001 | Hasimoto | ................ | 369/53.22 |
| 6,278,672 B1 * | 8/2001 | Kobayashi | ............... | 369/53.23 |
| 6,285,635 B1 * | 9/2001 | Watanabe et al. | ........ | 369/44.27 |
| 6,493,304 B1 * | 12/2002 | Watanabe et al. | ........ | 369/53.22 |
| 6,501,712 B1 * | 12/2002 | Masuda et al. | .......... | 369/44.27 |
| 6,822,936 B1 * | 11/2004 | Ono et al. | ............... | 369/53.23 |
| 6,868,052 B1 * | 3/2005 | Konno et al. | ............ | 369/53.23 |
| 6,970,408 B1 * | 11/2005 | Ono | ........................ | 369/53.23 |
| 6,975,574 B1 * | 12/2005 | Yanagawa et al. | ....... | 369/53.23 |

FOREIGN PATENT DOCUMENTS

JP    P2000-311427 A    11/2000

\* cited by examiner

*Primary Examiner*—Andrea Wellington
*Assistant Examiner*—Nathan Danielsen
(74) *Attorney, Agent, or Firm*—Winston Hsu (57) ABSTRACT

A method used in an optical disc reproducing system for identifying the type of an optical disc, wherein the optical disc reproducing system comprises a pickup; the pickup comprising a first light source and a second light source. The method comprises: (a) measuring a first time needed for the focus of the first light source to move from a plastic layer to a reflection layer of the optical disc; (b) measuring the characteristics of a focus error signal while the focus of the first light source is moving in the reflection layer of the optical disc; (c) measuring the characteristics of the focus error signal while the focus of the second light source is moving in the reflection layer of the optical disc; and (d) identifying the type of the optical disc according to the first time and the results measured in steps (b) and (c).

15 Claims, 7 Drawing Sheets

OPTICAL DISC IDENTIFICATION METHOD

BACKGROUND OF INVENTION

1. Field of the Invention

The invention relates to an optical disc identification method and more particularly, to a method used in an optical disc reproduction system for identifying the type of an optical disc.

2. Description of the Prior Art

Optical storage media is a commonly used media for storing large amounts of data. Compact discs (CD), digital versatile discs (DVD), and super audio compact disc (SACD) are examples of optical storage media. Many kinds of optical disc reproduction systems can be found on the market. One main feature is an optical disc reproduction system always combines the ability of reading information from a CD and the ability of reading information from a DVD (some systems even combine the ability of writing information onto a CD or a DVD). In order for an optical disc reproduction system with combined reading ability to identify the type of an optical disc, an effective optical disc identification method must be used.

Figure 1:
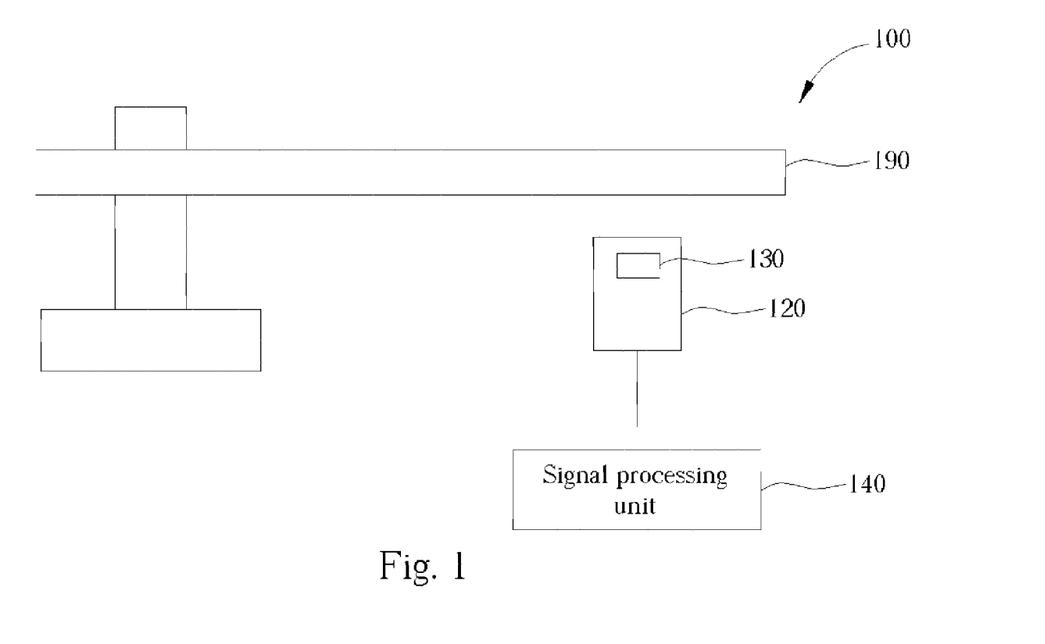
FIG. 1 is a block diagram of an optical disc reproduction system.

Please refer to FIG. 1 where a block diagram of an optical disc reproduction system is illustrated. The optical disc reproduction system 100 comprises a pickup 120. The pickup 120 comprises a CD light source, a DVD light source (neither are shown in this figure), and an object lens 130. A focus driving voltage (FOD) can drive the object lens 130 up or down (perpendicularly to the surface of the optical disc 190) in order to move the focus location of the CD light source or the DVD light source. The pickup 120 further comprises a light detector (also not shown in this figure) that can detect a light signal reflected back from the optical disc 190. A signal processing unit 140 processes the signal detected by the light detector into other kinds of signals or information that is needed.

Normally, the signal processing unit 140 generates a focus error signal (FE signal) and a radio frequency signal (RF signal). Different kinds of optical discs 190 generate different characteristics for the FE signal and RF signal.

Yang et al. in United States Patent Application Publication 2003/0039189 discloses a method for identifying the type of an optical disc. Generally speaking, the method measures the amplitude (a maximum subtracted by a minimum) of the FE signal generated by the signal processing unit 140 while the CD light source on the pickup 120 is turned on, and the object lens 130 is moving up and down. If the amplitude is larger than a predetermined threshold, then the optical disc 190 will be identified as a CD type optical disc (such as CD-ROM, CD+−RW); if the amplitude is smaller than the threshold, then the optical disc 190 will be identified as a DVD type optical disc (such as single-layer DVD-ROM, dual-layer DVD).

However, the optical disc reproduction system 100 usually has to deal with many kinds of optical discs, some of which may be of bad quality. Sometimes, the above-mentioned optical disc identification method using only one judging condition (the amplitude) wrongly identifies the disc type of an optical disc of bad quality. If a DVD-type optical disc is mistakenly identified by the optical disc reproduction system 100 as a CD-type optical disc or vice versa, the optical disc reproduction system 100 may not be able to read information stored in the optical disc correctly, or worse yet, the whole system may even break-down.

SUMMARY OF INVENTION

It is therefore a primary objective of the claimed invention to provide an optical disc identification method using more than one judging condition when identifying the type of an optical disc to solve the above-mentioned problem.

According to the claimed invention, for use in an optical disc reproduction system having a pickup comprising a first light source and a second light source, a method comprising: (a) measuring a first time needed for the focus of the first light source to move from a plastic layer to a reflection layer of an optical disc; (b) measuring the characteristics of a focus error signal while the focus of the first light source is moving in the reflection layer of the optical disc; (c) measuring the characteristics of the focus error signal while the focus of the second light source is moving in the reflection layer of the optical disc; and (d) identifying the type of the optical disc according to the first time and the measurements made in steps (b) and (c).

It is an advantage of the claimed invention that the use of the first time and the results measured in steps (b) and (c) as judging conditions for identifying the type of the optical disc leads to a more accurate identification.

It is another advantage that SACD-type optical discs can be correctly identified through the steps provided by the claimed invention.

These and other objectives of the present invention will no doubt become obvious to those of ordinary skill in the art after reading the following detailed description of the preferred embodiment that is illustrated in the various figures and drawings.

DETAILED DESCRIPTION

The optical disc identification method of the present invention can be used in an optical disc reproduction system as shown in FIG. 1; the following description will be detailed with references to the elements shown in FIG. 1.

The optical disc identification method of the present invention can be implemented with a sequence of controlling procedures. Roughly speaking, the sequence of controlling procedures changes the FOD for moving the location of the object lens 130, turns on or turns off the CD light source or the DVD light source, and records the characteristics of the FE signal and RF signal for use in the optical disc identification method (more about this point later).

Figure 2:
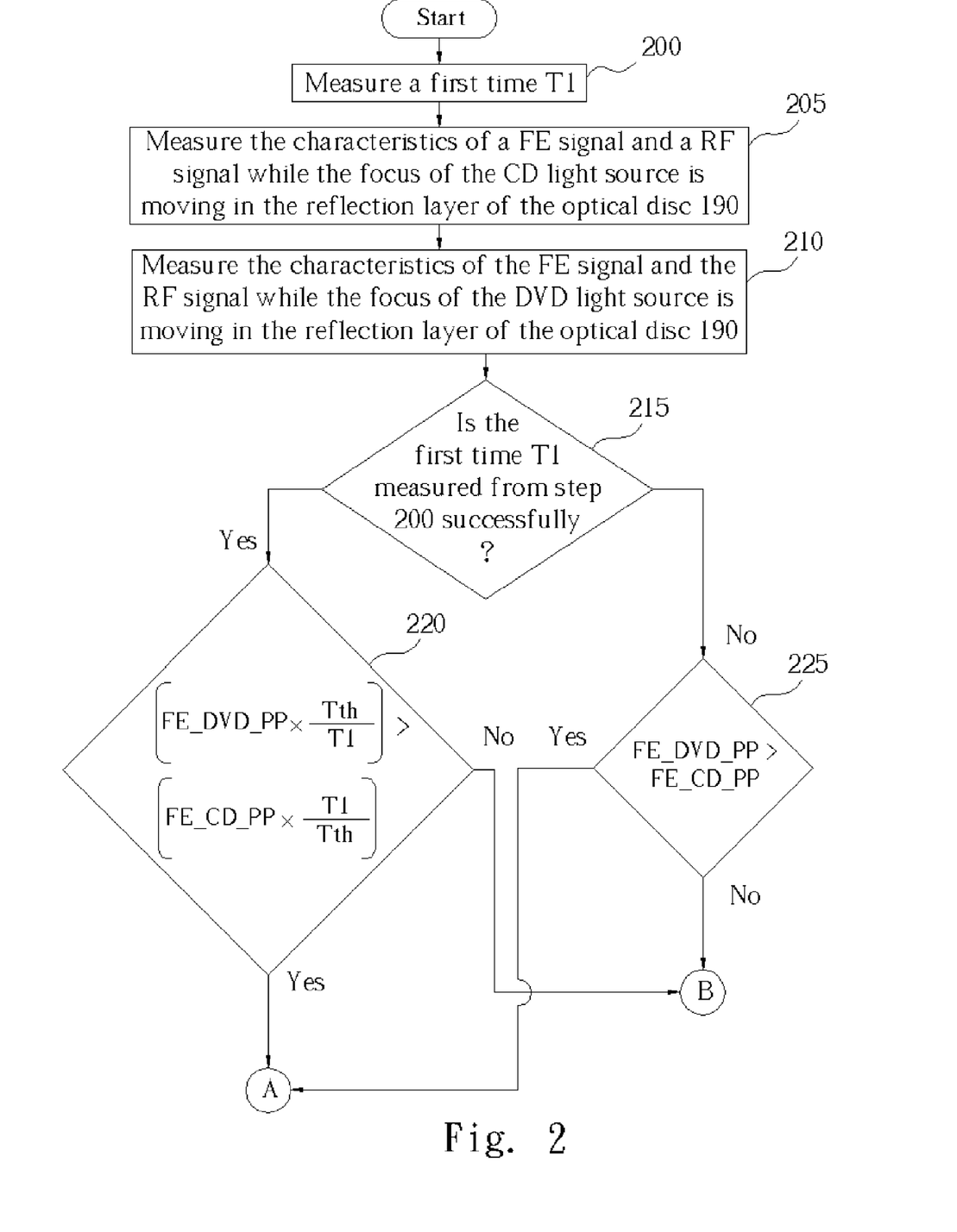
FIG. 2 is the base part of a flowchart describing the optical disc identification method of the present invention.
Figure 3:
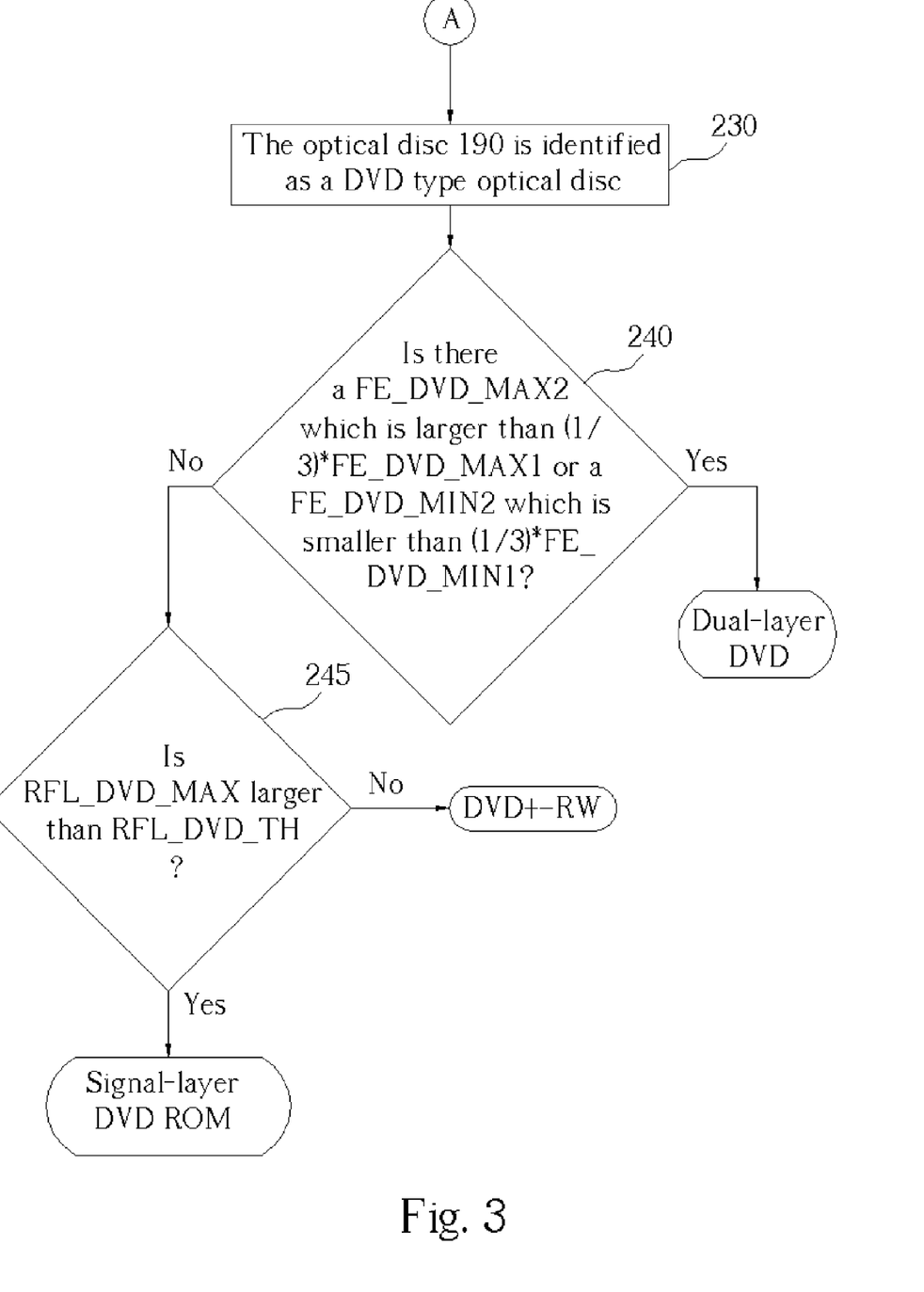
FIG. 3 is the "A" branch of the flowchart of FIG. 2.
Figure 4:
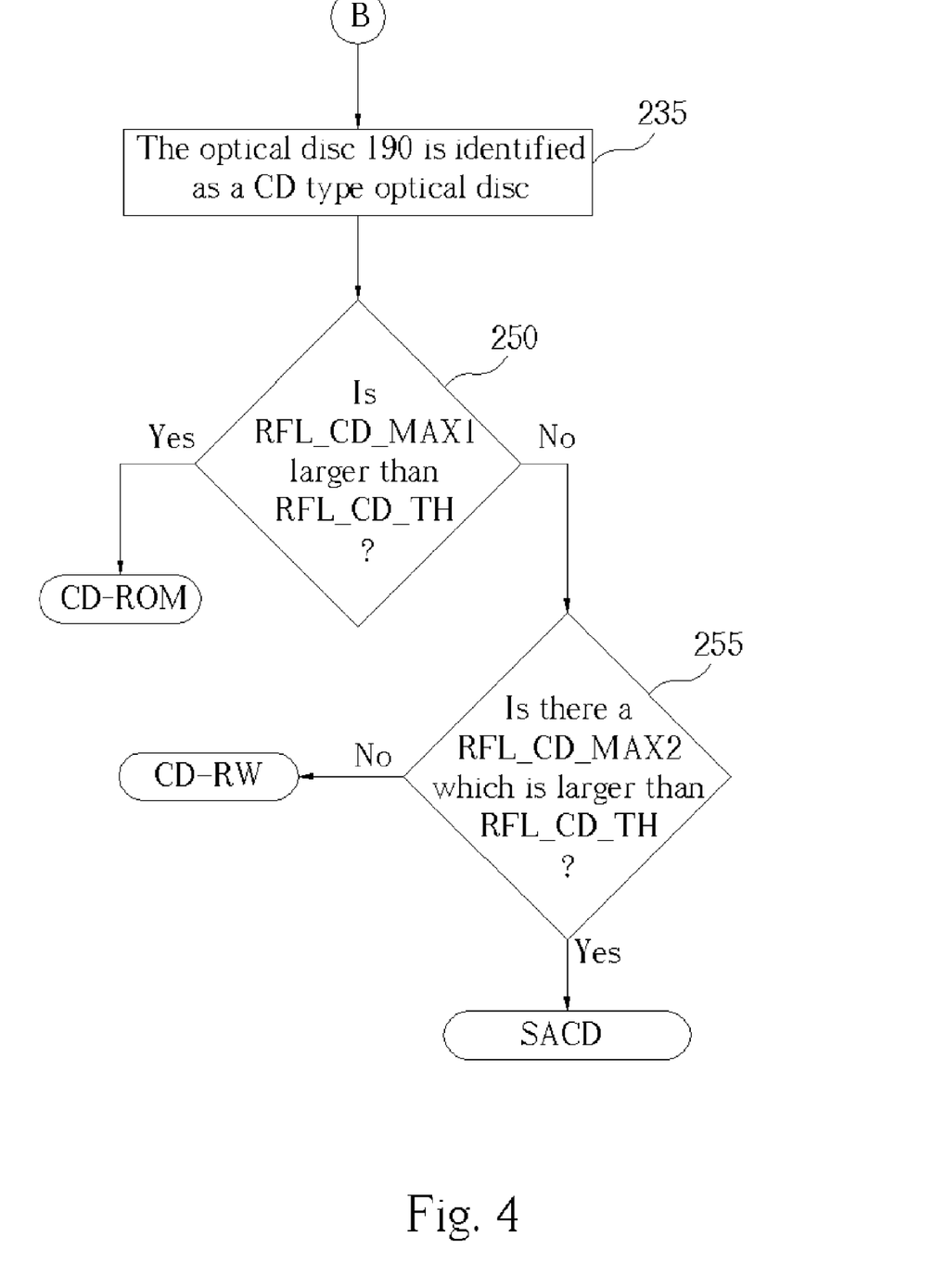
FIG. 4 is the "B" branch of the flowchart of FIG. 2.

First, please refer to FIG. 2–FIG. 4 where a flowchart describing an optical disc identification method of the present invention is illustrated. Please note that 'A' in FIG.

3 is the continuation of 'A' in FIG. 2 and 'B' in FIG. 4 is the continuation of 'B' in FIG. 2. The steps are described in more detail in the following.

200: Measure a first time T1 needed for the focus of the CD light source to move from a plastic layer to a reflection layer of the optical disc 190.

205: Measure the characteristics of a FE signal and a RF signal while the focus of the CD light source is moving in the reflection layer of the optical disc 190.

210: Measure the characteristics of the FE signal and the RF signal while the focus of the DVD light source is moving in the reflection layer of the optical disc 190.

215: If the first time T1 is successfully measured from step 200, enter step 220, otherwise enter step 225.

220: The FE signal measured in step 205 comprises a first maximum FE_CD_MAX and a first minimum FE_CD_MIN; the FE signal measured in step 210 comprises a second maximum FE_DVD_MAX and a second minimum FE_DVD_MIN. Compute a first difference FE_CD_PP by subtracting the first minimum FE_CD_MIN from the first maximum FE_CD_MAX, and compute a second difference FE_DVD_PP by subtracting the second minimum FE_DVD_MIN from the second maximum FE_DVD_MAX. Use the first time T1, the first difference FE_CD_PP, and the second difference FE_DVD_PP as judging conditions for identifying the type of the optical disc 190. In this embodiment, an equation (1) is used, when the result of equation (1) is TRUE, enter step 230; if the result of equation (1) is FALSE, enter step 235. The equation is as follows:

$$\left(FE\_DVD\_PP \times \frac{Tth}{T1}\right) > \left(FE\_CD\_PP \times \frac{T1}{Tth}\right) \qquad (1)$$

wherein Tth is a time threshold. Because DVD type optical discs and CD type optical discs have different characteristics, generally speaking, if the optical disc 190 is a DVD type optical disc, FE_DVD_PP is always larger than FE_CD_PP; if the optical disc 190 is a CD type optical disc, FE_DVD_PP is always smaller than FE_CD_PP. However, only comparing FE_DVD_PP with FE_CD_PP sometimes is not enough for correctly identifying the type of the optical disc 190, so in this embodiment the first time T1 is also used as a judging condition. Generally speaking, the distance between the plastic layer and the reflection layer of a DVD type optical disc is always shorter than the distance between the plastic layer and the reflection layer of a CD type optical disc, so normally the first time T1 measured for a DVD type optical disc will be smaller than the first time T1 measured for a CD type optical disc. If a time threshold Tth is set suitably, when the optical disc 190 is a DVD type optical disc, normally;

$$\frac{T1}{Tth} < 1$$

and $$\frac{Tth}{T1} > 1;$$

when the optical disc 190 is a CD type optical disc, normally.

$$\frac{T1}{Tth} > 1$$

and $$\frac{Tth}{T1} < 1.$$

So using equation (1) to determine whether the optical disc 190 is a DVD type or a CD type optical disc, the accuracy on identifying the type will be better than using only FE_DVD_PP and FE_CD_PP as judging conditions. Please notice that equation (1) here just serves for an example, any equation having the same intention as equation (1) can be used in this step.

225: Compute the first difference FE_CD_PP by subtracting the first minimum FE_CD_MIN from the first maximum FE_CD_MAX, and compute the second difference FE_DVD_PP by subtracting the second minimum FE_DVD_MIN from the second maximum FE_DVD_MAX. Use the first difference FE_CD_PP and the second difference FE_DVD_PP as judging conditions for identifying the type of the optical disc 190. In this embodiment, an equation (2) is used, when the result of equation (2) is TRUE, enter step 230; if the result of equation (2) is FALSE, enter step 235. The equation is as follows:

$$FE\_DVD\_PP > FE\_CD\_PP \qquad (2)$$

230: The optical disc 190 is identified as a DVD type optical disc (including signal-layer DVD-ROM, dual-layer DVD, etc.).

235: The optical disc 190 is identified as a CD type optical disc (including CD-ROM, CD+−RW, SACD, etc.).

240: Check if the FE signal measured in step 210 comprises a first local maximum FE_DVD_MAX1 that is larger than a first threshold DUAL_TH_UP (FE_DVD_MAX1 probably equals FE_DVD_MAX) and a first local minimum FE_DVD_MIN1 that is smaller than a second threshold DUAL_TH_DOWN (FE_DVD_MIN1 probably equals FE_DVD_MIN). Then check if the FE signal measured in step 210 further comprises of either a second local maximum FE_DVD_MAX2 that is larger than the first local maximum FE_DVD_MAX1 multiplied by a first factor (which in this embodiment equals ⅓) or a second local minimum that is smaller than the first local minimum FE_DVD_MIN1 multiplied by a second factor (which in this embodiment equals ⅓). If its TRUE, then the optical disc 190 is identified as a dual-layer DVD. Otherwise, enter step 245. In this step, the first threshold DUAL_TH_UP and the second threshold DUAL_TH_DOWN are for eliminating the effect of noise in the FE signal.

245: Check if the RF signal measured in step 210 comprises a maximum RF_DVD_MAX that is larger than a third threshold RF_DVD_TH. If it is TRUE, then the optical disc 190 is identified as a signal-layer DVD-ROM; otherwise, the optical disc 190 is identified as a DVD+−RW. Generally speaking, the RF_DVD_MAX measured for a signal-layer DVD-ROM is always larger than the RF_DVD_MAX measured for a DVD+−RW. So by choosing a value for the threshold RF_TH properly, these two kinds of optical discs can be correctly distinguished.

250: Check whether the RF signal measured in step 205 comprises a first local maximum RF_CD_MAX1 that is larger than a fourth threshold RF_CD_TH. If that is TRUE, then the optical disc 190 is identified as a CD-ROM; otherwise, enter step 255.

255: Check whether the RF signal measured in step 210 comprises a second local maximum RF_CD_MAX2 that is larger than the fourth threshold RF_CD_TH. If that is TRUE, then the optical disc 190 is identified as a SACD; otherwise, the optical disc 190 is identified as a CD-RW.

For implementing the present optical disc identification method, as mentioned before, the optical disc reproduction system 100 can use a sequence of controlling procedures. By first measuring and recording the FE signal and the RF signal during the whole sequence of controlling procedures (or during several of the procedures) and then using the identification method shown in FIG. 2–FIG. 4, different kinds of optical discs can be correctly identified. Next, an example of a sequence of controlling procedure will be introduced.

In the beginning, the CD light source is turned on; the object lens 130 moves down to the end; and the FE signal and the RF signal are calibrated. Afterwards, the object lens 130 is moved up quickly. While the object lens 130 is moving up from the lowest point, the optical disc reproduction system 100 will detect when the focus of the CD light source enters the plastic layer of the optical disc 190. When the optical disc reproduction system 100 detects the focus of the CD light source has gone past the plastic layer the optical disc 190, the moving up speed of the object lens 130 is slowed down. The optical disc reproduction system 100 will then detect when the focus of the CD light source enters the reflection layer of the optical disc 190. After the optical disc reproduction system 100 has detected that the focus of the CD light source has gone past the reflection layer of the optical disc 190, the object lens 130 will continue to move until it reaches a stopping point, and the CD light source is turned off.

Next, the DVD light source is turned on; the FE signal and the RF signal are calibrated; and the object lens 130 is moved down. As the object lens 130 moves down, the optical disc reproduction system 100 detects when the focus of the DVD light source enters the reflection layer of the optical disc 190. The optical disc reproduction system 100 will then detect when the focus of the DVD light source comes off the reflection layer of the optical disc 190. The final procedure is to analyze the recorded signals.

The identification method shown in FIG. 2-FIG. 4 can be implemented concurrently with the above-mentioned sequence of controlling procedures; however, it can also be implemented after the sequence of controlling procedures is done.

With the above-mentioned sequence of controlling procedures, the optical disc reproduction system 100 has to be provided with the ability of knowing where the location of the focus of the CD light source or the DVD light source is inside the optical disc 190. Generally speaking, for the system to know where the location of the focus of the CD or DVD light source is inside the optical disc 190, a simple solution is to measure the characteristics of the RF signal.

To avoid the effect of noise while measuring the characteristics of the RF signal, an accumulation way can be used. For example, after the first calibration procedure and while the object lens 130 is moving up, keep measuring the value of the RF signal. When a measured value of the RF signal is larger than a previously measured value, add the measured value into an accumulating value (the default value of the accumulating value is zero); when the measured value of the RF signal is smaller than the previously measured value, reset the accumulating value to zero. Until the accumulating value exceeds a predetermined plastic layer threshold, the system knows that the focus of the CD light source has already entered the plastic layer of the optical disc 190. When the RF signal passes through a maximum value, the RF signal will become smaller than half of the maximum value, so that the system knows the focus of the CD light source has gone past the plastic layer of the optical disc 190.

Next, continue measuring the RF signal. Similarly, when a measured value of the RF signal is larger than a previous measured value, add the measured value into the accumulating value; when the measured value of the RF signal is smaller than the previous measured value, reset the accumulating value to zero. Until the accumulating value exceeds a predetermined reflection layer threshold, the system knows that the focus of the CD light source has already entered the reflection layer of the optical disc 190. After a moment, start measuring the RF signal again. When the RF signal becomes lower than half the value of the RF signal obtained when the focus of the CD light source entered the reflection layer, the system knows that the focus of the CD light source has gone past the reflection layer of the optical disc 190.

The accumulation way is still used in the same way when the object lens 130 moves down. Until the accumulating value exceeds a predetermined reflection layer threshold, the system knows that the focus of the DVD light source has already entered the reflection layer of the optical disc 190. When the RF signal becomes smaller than half the value of the RF signal obtained when the focus of the DVD light source entered the reflection layer, the system knows that the focus of the DVD light source has already come off the reflection layer of the optical disc 190.

Figure 5:
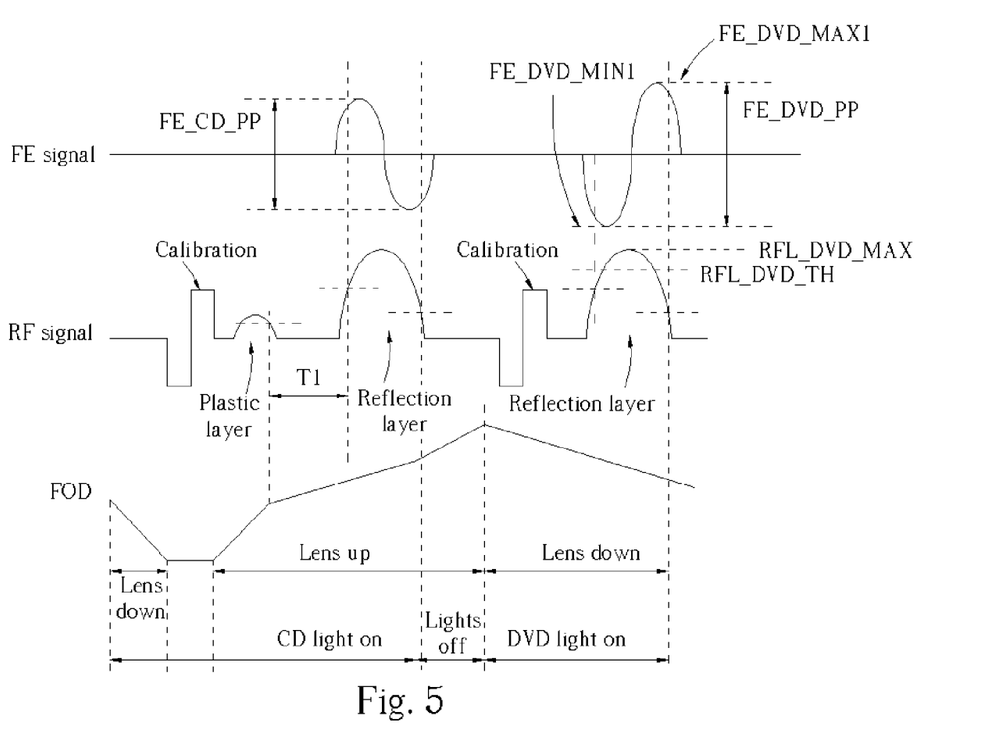
FIG. 5 is an example of signals detected using the sequence of controlling procedures when the optical disc 190 is a signal-layer DVD-ROM.

Please refer to FIG. 5 where an example of signals detected using the sequence of controlling procedures when the optical disc 190 is a signal-layer DVD-ROM is illustrated. Please notice that the parameters needed for the identification method (such as FE_DVD_MAX, FE_CD_MAX, etc.) can be gathered after the sequence of controlling procedures is done or concurrently during the execution of the sequence of controlling procedures.

Because the first time T1 is measured successfully, the identification method will go from step 215 to step 220. In step 220, a TRUE result in equation (1) will cause the identification method to enter step 230 where the optical disc 190 will be identified as a DVD type optical disc and then enter step 240. Step 240 can be viewed as a step for identifying a dual-layer DVD. Obviously in FIG. 5, when the focus of the DVD light source is moving in the reflection layer of the optical disc 190, the FE signal comprises only one local minimum FE_DVD_MIN1 and only one local maximum FE_DVD_MAX1, so in step 240 the optical disc 190 will not be identified as a dual-layer DVD, and the method will enter step 245. It can also be seen from FIG. 5 that the RF_DVD_MAX is larger than the third threshold RF_DVD_TH, so the optical disc 190 will be correctly identified as a signal-layer DVD-ROM.

Figure 6:
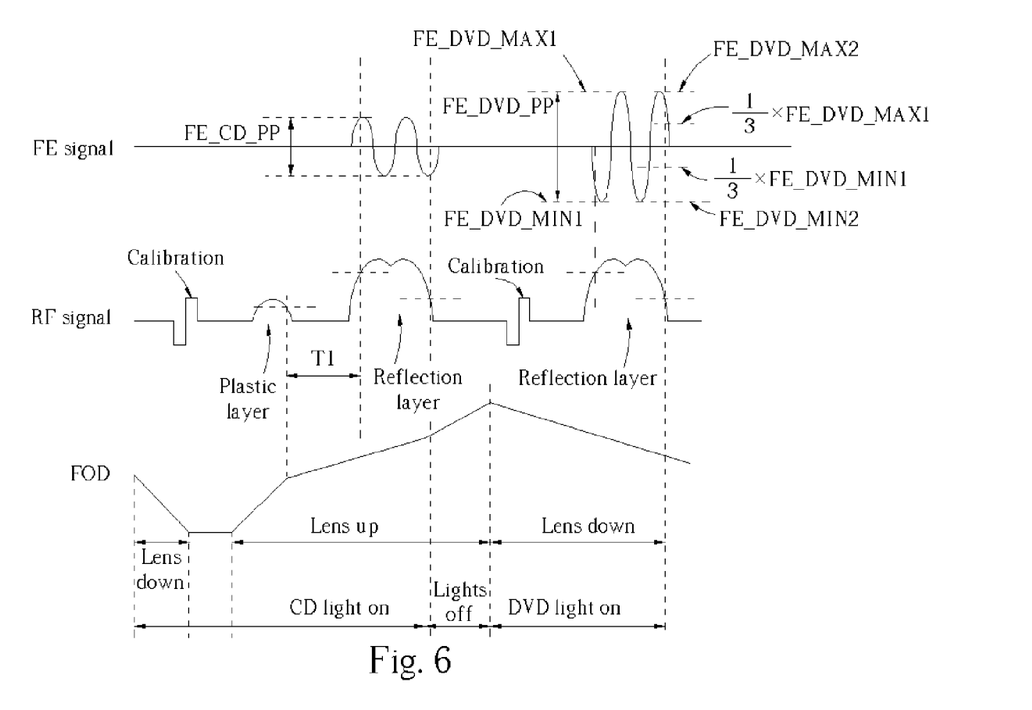
FIG. 6 is an example of signals detected using the sequence of controlling procedures when the optical disc 190 is a dual-layer DVD.

Please refer to FIG. 6 where an example of signals detected using the sequence of controlling procedures when the optical disc 190 is a dual-layer DVD is illustrated. The flow from steps 200–230 is the same as that of for a signal-layer DVD-ROM. However, in step 240, in addition to a first local maximum FE_DVD_MAX1 and a first local minimum FE_DVD_MIN1, the FE signal measured while the focus of the DVD light source is moving in the reflection layer of the optical disc 190 further comprises a second local maximum FE_DVD_MAX2 that is larger than (⅓)*FE_DVD_MAX1 and a second local minimum FE_DVD_MIN2 that is smaller than (⅓)*FE_DVD_MIN1, so the optical disc 190 will be correctly identified as a dual-layer DVD in step 240.

Figure 7:
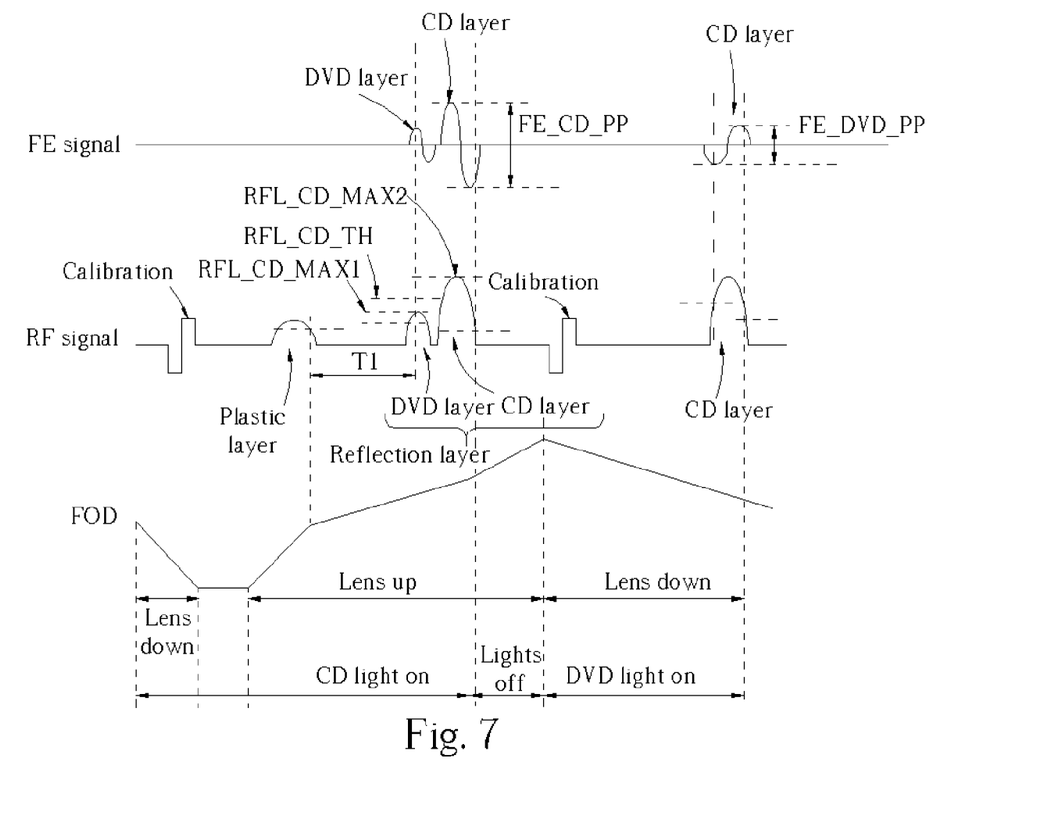
FIG. 7 is an example of signals detected using the sequence of controlling procedures when the optical disc 190 is a SACD.

Please refer to FIG. 7 where an example of signals detected using the sequence of controlling procedures when the optical disc 190 is a SACD is illustrated. As mentioned before, SACD is an acronym for super audio compact disc; the reflection layer of a SACD comprises a DVD layer and a CD layer, wherein the DVD layer is closer to the plastic layer. When the identification method is used to survey the signals shown in FIG. 7, the flow will be from step 200 via 205, 210, 215, 220 to step 235 where the optical disc 190 will be identified as a CD type optical disc. In step 250, because the RF signal measured while the focus of the CD light source is moving in the reflection layer of the optical disc 190 comprises a first local maximum RF_CD_MAX1 that is smaller than the fourth threshold RF_CD_TH, the optical disc will not be identified as a CD-ROM, and the identification method will enter step 255. Step 255 can be viewed as a step for identifying SACD. Because the RF signal measured while the focus of the CD light source is moving in the reflection layer of the optical disc 190 further comprises a second local maximum RF_CD_MAX2 that is larger than the fourth threshold RF_CD_TH, the optical disc 190 will be correctly identified as a SACD.

Of course, aside from signal-layer DVD-ROMs, dual-layer DVDs, and SACDs, other kinds of optical discs can be identified correctly by the presented optical disc identification method. Also, aside from the above-mentioned sequence of controlling procedures, other kinds of sequences of controlling procedures can be used in the company with the presented optical disc identification method as long as the sequence of controlling procedures allows the system to gather the parameters needed in the presented optical disc identification method.

In contrast to the prior art, the present invention method measures a first time needed for the focus of a first light source to move from a plastic layer to a reflection layer of an optical disc and uses the first time combined with other measured results as judging conditions for identifying the type of the optical disc. The accuracy in identification can be better than that of the prior art.

Those skilled in the art will readily observe that numerous modification and alternation of the device may be made while retaining the teaching of the invention. Accordingly, the above disclosure should be construed as limited only by the metes and bounds of the appended claims.

What is claimed is:

1. An optical disc identification method for identifying the type of an optical disc in an optical disc reproduction system, wherein the optical disc reproduction system comprises a pickup, the pickup comprising a first light source and a second light source, the optical disc identification method comprising:
   (a) measuring a first time needed for the focus of the first light source to move from a plastic layer to a reflection layer of the optical disc;
   (b) measuring the characteristics of a focus error signal while the focus of the first light source is moving in the reflection layer of the optical disc;
   (c) measuring the characteristics of the focus error signal while the focus of the second light source is moving in the reflection layer of the optical disc;
   (d) combining the result measured in step (c) with the first time to determine a first judging value, and combining the result measured in step (b) with the first time to determine a second judging value; and
   (e) identifying the type of the optical disc according to at least the first judging value and the second judging value.

2. The optical disc identification method of claim 1, wherein the first light source is a CD light source and the second light source is a DVD light source.

3. The optical disc identification method of claim 1, wherein the focus error signal measured in step (b) comprises a first maximum and a first minimum, and the focus error signal measured in step (c) comprises a second maximum and a second minimum.

4. The optical disc identification method of claim 3, wherein the method further comprises computing a first difference by subtracting the first minimum from the first maximum, and computing a second difference by subtracting the second minimum from the second maximum, and in step (d), the method uses the first time, the first difference, and the second difference to determine the first judging value and the second judging value.

5. The optical disc identification method of claim 4, wherein in step (d), if the first judging value which equals the second difference multiplied by a time threshold then divided by the first time is larger than the second judging value which equals the first difference multiplied by the first time then divided by the time threshold, then the optical disc is identified as a DVD type optical disc, otherwise the optical disc is identified as a CD type optical disc.

6. The optical disc identification method of claim 1, wherein if the optical disc is identified as a DVD type optical disc, the method further comprises:
   (f) determining whether the optical disc is a dual-layer DVD according to the results measured in step (c).

7. The optical disc identification method of claim 6, wherein step (f) means that aside from a first local maximum and a first local minimum, if the focus error signal measured in step (c) further comprises a second local maximum which is larger than the first local maximum multiplied by a first factor or a second local minimum which is smaller than the first local minimum multiplied by a second factor, then identify the optical disc as a dual-layer DVD.

8. The optical disc identification method of claim 7, wherein the first factor is ⅓.

9. The optical disc identification method of claim 7, wherein the second factor is ⅓.

10. The optical disc identification method of claim 6, wherein if the optical disc is determined as not being a dual-layer DVD, then the method further comprises:
    (g) measuring the characteristics of a radio frequency signal while the focus of the second light source is moving in the reflection layer of the optical disc for identifying the optical disc as a single layer DVD-ROM or a DVD+–RW.

11. The optical disc identification method of claim 10, wherein step (g) means that if the radio frequency signal measured while the focus of the second light source is moving in the reflection layer of the optical disc comprises a maximum which is larger than a third threshold, then identifying the optical disc as a single layer DVD-ROM, otherwise identifying the optical disc as a DVD+–RW.

12. The optical disc identification method of claim 1, wherein if the optical disc is identified as a CD type optical disc, then the method further comprises:
    (h) measuring the characteristics of a radio frequency signal while the focus of the first light source is moving in the reflection layer of the optical disc.

13. The optical disc identification method of claim 12, wherein if the radio frequency signal measured in step (h)

comprises a first local maximum which is larger than a fourth threshold, then identifying the optical disc as a CD-ROM.

14. The optical disc identification method of claim 12, wherein if the radio frequency signal measured in step (h) comprises a first local maximum which is smaller than a fourth threshold and a second local maximum which is larger than the fourth threshold, then identifying the optical disc as a SACD, otherwise identifying the optical disc as a CD-RW.

15. An optical disc identification method for identifying the type of an optical disc in an optical disc reproduction system, wherein the optical disc reproduction system comprises a pickup, the pickup comprising a first light source and a second light source, the optical disc identification method comprising:

(a) measuring the characteristics of a focus error signal while the focus of the first light source is moving in a reflection layer of the optical disc;

(b) measuring the characteristics of the focus error signal while the focus of the second light source is moving in the reflection layer of the optical disc;

(c) measuring a first time needed for the focus of the first light source to move from a plastic layer to the reflection layer of the optical disc; and (d) simultaneously referencing results measured in steps (a) and (b) and the first time measured in step (c) to identify the type of the optical disc.

* * * * *